US006330657B1

(12) United States Patent
Col et al.

(10) Patent No.: US 6,330,657 B1
(45) Date of Patent: Dec. 11, 2001

(54) PAIRING OF MICRO INSTRUCTIONS IN THE INSTRUCTION QUEUE

(75) Inventors: Gerard M. Col; G. Glenn Henry, both of Austin, TX (US)

(73) Assignee: IP-First, L.L.C., Fremont, CA (US)

( * ) Notice: Subject to any disclaimer, the term of this patent is extended or adjusted under 35 U.S.C. 154(b) by 0 days.

(21) Appl. No.: 09/313,907

(22) Filed: May 18, 1999

(51) Int. Cl.[7] .............................. G06F 9/30; G06F 9/38; G06F 9/40

(52) U.S. Cl. ........................... 712/23; 712/219; 712/215; 712/206; 712/245; 712/217; 712/20; 711/125; 711/123; 711/218

(58) Field of Search .................................. 712/1, 2, 3, 8, 712/9, 20, 21, 22, 23, 26, 34, 41, 42, 206, 212, 207, 32, 215, 242, 219, 243, 217, 245, 237, 24; 710/52; 711/125, 123, 218

(56) References Cited

U.S. PATENT DOCUMENTS 4,858,105 * 8/1989 Kuriyama et al. .
5,475,824 * 12/1995 Grochowski et al. .
5,530,825 * 6/1996 Black et al. ........................ 711/213
5,559,977 * 9/1996 Avnon et al. ........................ 712/244
5,598,546 * 1/1997 Blomgren ............................ 712/209
5,617,549 * 4/1997 DeLano ................................ 712/206
6,131,158 * 10/2000 Matsuo et al. ...................... 712/244

* cited by examiner

*Primary Examiner*—Daniel H. Pan
(74) *Attorney, Agent, or Firm*—Richard K. Huffman; James W. Huffman

(57) ABSTRACT

An apparatus and method are presented for increasing the throughput within a single-channel of a pipeline microprocessor. Back-to-back pairs of micro instructions are evaluated to determine if they can be combined for execution in parallel. If so, then they are combined and issued for concurrent execution. The apparatus includes a micro instruction queue that buffers and orders micro instructions for sequential execution by the pipeline microprocessor. Within the micro instruction queue, a second micro instruction is ordered to execute immediately following execution of a first micro instruction. Pairing logic is coupled to the micro instruction queue. The pairing logic combines the first and second micro instructions so that the first and second micro instructions are executed in parallel by the pipeline microprocessor.

36 Claims, 8 Drawing Sheets

*Execution of Back-to-Back Non-Conflicting Micro Instructions*

| Cycle | Fetch | Translate | Register | |
|---|---|---|---|---|
| 1 | ADD AX,BX | *** | *** | |
| 2 | MOV BX,[CX] | ADD AX,BX | *** | |
| 3 | *** | MOV BX,[CX] | ADD AX,BX | 2 cycles |
| 4 | *** | *** | LD BX,[CX] | |
| 5 | ADD AX,[BX] | *** | *** | |
| 6 | *** | ADD AX,[BX] | *** | |
| 7 | *** | *** | LD T1,[BX] | 2 cycles |
| 8 | *** | *** | ADD AX,T1 | |
| 9 | MOV AX,[CX] | *** | *** | |
| 10 | PADDD M1,M2 | MOV AX,[CX] | *** | |
| 11 | *** | PADDD M1,M2 | LD AX,[CX] | 2 cycles |
| 12 | *** | *** | PADDD M1,M2 | |
| 13 | MOVD M1,[BX] | *** | *** | |
| 14 | PADDD M2,M3 | MOVD M1,[BX] | *** | |
| 15 | *** | PADDD M2,M3 | LD M1,[BX] | 2 cycles |
| 16 | *** | *** | PADDD M2,M3 | |
| 17 | ADD AX,BX | *** | *** | |
| 18 | PADDD M1,M2 | ADD AX,BX | *** | |
| 19 | *** | PADDD M1,M2 | ADD AX,BX | 2 cycles |
| 20 | *** | *** | PADDD M1,M2 | |
| 21 | PADDD M1,M2 | *** | *** | |
| 22 | PADDD M3,M4 | PADDD M1,M2 | *** | |
| 23 | *** | PADDD M3,M4 | PADDD M1,M2 | 2 cycles |
| 24 | *** | *** | PADDD M3,M4 | |

*Paired Instructions Microprocessor Pipeline Stages*

400

FIG. 5 (Con't.)

*Execution of Paired Micro Instructions*

| Cycle | Fetch | Translate | Register (Ins #1) | Register (Ins #2) | |
|---|---|---|---|---|---|
| 1 | ADD AX,BX | *** | *** | *** | |
| 2 | MOV BX,[CX] | ADD AX,BX | *** | *** | |
| 3 | *** | MOV BX,[CX] | *** | *** | |
| 4 | *** | *** | ADD AX,BX | LD BX,[CX] | 1 cycle |
| 5 | ADD AX,[BX] | *** | *** | *** | |
| 6 | *** | ADD AX,[BX] | *** | *** | |
| 7 | *** | *** | LD T1,[BX] | ADD AX,T1 | 1 cycle |
| 8 | *** | *** | *** | *** | |
| 9 | MOV AX,[CX] | *** | *** | *** | |
| 10 | PADDD M1,M2 | MOV AX,[CX] | *** | *** | |
| 11 | *** | PADDD M1,M2 | *** | *** | |
| 12 | *** | *** | LD AX,[CX] | PADDD M1,M2 | 1 cycle |
| 13 | MOVD M1,[BX] | *** | *** | *** | |
| 14 | PADDD M2,M3 | MOVD M1,[BX] | *** | *** | |
| 15 | *** | PADDD M2,M3 | *** | *** | |
| 16 | *** | *** | LD M1,[BX] | PADDD M2,M3 | 1 cycle |
| 17 | ADD AX,BX | *** | *** | *** | |
| 18 | PADDD M1,M2 | ADD AX,BX | *** | *** | |
| 19 | *** | PADDD M1,M2 | *** | *** | |
| 20 | *** | *** | ADD AX,BX | PADDD M1,M2 | 1 cycle |
| 21 | PADDD M1,M2 | *** | *** | *** | |
| 22 | PADDD M3,M4 | PADDD M1,M2 | *** | *** | |
| 23 | *** | PADDD M3,M4 | *** | *** | |
| 24 | *** | *** | PADDD M1,M2 | PADDD M3,M4 | 1 cycle |

PAIRING OF MICRO INSTRUCTIONS IN THE INSTRUCTION QUEUE

CROSS-REFERENCE TO RELATED APPLICATIONS

This application is related to copending U.S. patent application Ser. No. 09/313,908, entitled, PAIRING OF LOAD-ALU-STORE WITH CONDITIONAL BRANCH, having the same assignee and being filed on the same day as this application.

BACKGROUND OF THE INVENTION

1. Field of the Invention

This invention relates in general to the field of instruction execution in computers, and more particularly to an apparatus and method for combining two micro instructions for parallel execution within a single channel of a pipeline microprocessor.

2. Description of the Related Art

A present day pipeline microprocessor has a single path, or channel, or pipeline, that is divided into stages that perform specific tasks. Each of the specific tasks are part of an overall operation that is directed by a programmed instruction. Each of the programmed instructions, or macro instructions, in a software application program is executed in sequence by the microprocessor. As a macro instruction enters the first stage of the pipeline, certain tasks are accomplished. The instruction is then passed to subsequent stages for accomplishment of subsequent tasks. Following completion of a final task, the instruction completes execution and exits the pipeline. Execution of programmed instructions by a pipeline microprocessor is very much analogous to the manufacture of items on an assembly line.

One of the obvious aspects of any assembly line is that there are multiple items resident in the line in successive stages of assembly during any given point in time. The same is true for a pipeline microprocessor. During any cycle of a pipeline clock signal, there are multiple instructions present in the various stages, with each of the instructions being at successive levels of completion.

As with assembly lines, pipeline microprocessors can exhibit tremendous efficiency, or they can manifest problems. It goes undisputed that one of the main objectives of microprocessor design is to have instructions move through the pipeline to completion as quickly as possible. To an end user, efficient throughput means faster displays, quicker connections, and more recently, intelligible speech and digital video presentation that more closely represent reality.

The present inventors have noted that prevalent desktop computer application programs exhibit throughput bottlenecks when they are executed by present day microprocessors. The present inventors have identified three limitations of present day microprocessors that each contribute to this throughput problem: 1) the continued use of combined logic within a single stage to perform either a memory access operation or an integer arithmetic/logic operation; 2) insufficient logic resources to perform single-instruction multiple-data (SIMD) operations; and 3) inefficient utilization of logic resources within successive stages of a single-channel microprocessor pipeline.

With regard to the first limitation, early microprocessors had an integer execution stage that was dedicated to performing either a memory access (i.e., a load or a store of operands from memory) or an arithmetic/logical function. And because these early microprocessors executed integer operations only, the combined memory/arithmetic stage was not a problem. However, in just a few years, a new set of operations, floating point operations, were introduced into the realm of desktop computing. Because of the distinct nature and complexity of floating point data and associated floating point operations, it was required that dedicated floating point execution logic be incorporated into the microprocessor architecture. But since application programs still performed more integer operations than floating point operations, microprocessor designers chose to utilize existing capabilities of integer execution logic to load floating point data from memory while adding only the logic necessary to perform the floating point operations. Hence, to perform a floating point operation on a floating point operand located in memory required the execution of two instructions through the single instruction channel of the pipeline microprocessor: a first instruction, executed by the integer execution unit, to load the floating point operand from memory, and a second instruction, executed by the floating point execution logic, to perform the prescribed floating point operation on the floating point operand.

In more recent years, another new set of operations, single-instruction multiple-data (SIMD) operations, have been introduced into domain of desktop computing. SIMD instructions perform the same operation, say addition, on multiple data items at the same time. Such a feature is very useful for video and speech processing applications. And like what was done when floating point operations were introduced, to take advantage of existing memory access logic in the integer execute stage, only the logic necessary to perform SIMD operations has been added to the already existing single-channel pipeline architecture. Hence, to perform a SIMD operation on a SIMD operand located in memory also requires the execution of two instructions through the single instruction channel: a first instruction, executed by the integer execution unit, to load the SIMD operand from memory, and a second instruction, executed by the SIMD execution logic, to perform the prescribed SIMD operation on the SIMD operand.

The combined memory access/arithmetic structure of a present day integer execution unit presents a serious bottleneck to the execution of floating point, SIMD, and integer instructions that require data to be first loaded from memory. As is described above, two instructions are required to perform an operation on an operand in memory: one instruction to load the operand, and another instruction to perform the prescribed operation.

With regard to the second limiting factor, the present inventors have also noted increased use of SIMD instructions in more recent application programs. Because large numbers of SIMD instructions are now being used, the capacity of existing SIMD execution logic to handle the large numbers of SIMD instructions has become an issue of concern.

Finally, a third limitation of present day microprocessors regards the inefficient use of logic resources in various stages of a single-channel pipeline, as seen when executing back-to-back instructions. For example, a first instruction may utilize logic resources in, say, even numbered stages of the instruction pipeline, while a following instruction may employ logic resources in, say, odd numbered stages. The two instructions could conceivably be executed concurrently in many cases, in half the time, thus making more efficient use of stages within the instruction execution channel of the pipeline microprocessor.

Therefore, what is needed is an apparatus in a pipeline microprocessor that allows instructions to be combined within a single channel so that application programs can execute faster than has heretofore been achievable.

In addition, what is needed is a pipeline microprocessor architecture that does not require memory access operations to be performed by the same pipeline stage that performs integer arithmetic/logic operations.

Furthermore, what is needed is a microprocessor that can execute large numbers of SIMD instructions without exhibiting present day timing delays.

Moreover, what is needed is a method for combining instructions within a single channel of a pipeline microprocessor in a manner that increases the execution speed of prevalent present day application programs without substantially increasing the cost of the pipeline microprocessor.

SUMMARY

To address the above-detailed deficiencies, it is an object of the present invention to provide an apparatus in a single channel of a pipeline microprocessor that pairs non-conflicting instructions together for concurrent execution.

Accordingly, in the attainment of the aforementioned object, it is a feature of the present invention to provide a apparatus for pairing micro instructions for parallel execution by a pipeline microprocessor. The apparatus includes a micro instruction queue and pairing logic. The micro instruction queue buffers and orders micro instructions for sequential execution by the pipeline microprocessor. A second micro instruction in the micro instruction queue is ordered to execute immediately following execution of a first micro instruction. The pairing logic is coupled to the micro instruction queue and combines the first and second micro instructions so that the first and second micro instructions are executed in parallel, within a s ingle pipeline of the pipeline microprocessor.

An advantage of the present invention is that logic resources in the microprocessor pipeline stages are efficiently utilized during each pipeline clock cycle.

Another object of the present invention is to provide a pipeline microprocessor architecture that has memory access logic stages which are separated from its integer arithmetic/logical stage.

In another aspect, it is a feature of the present invention to provide an apparatus within a single-channel of a pipeline microprocessor for executing non-conflicting micro instructions in parallel. The apparatus has pairing logic and two micro instruction registers. The pairing logic combines a first micro instruction with a following micro instruction so that the first micro instruction and the following micro instruction are queued for parallel execution within a first pipeline the pipeline microprocessor. The two micro instruction registers are coupled to the pairing logic. The two micro instruction registers receive the first and following micro instructions following combination and issue the first and following micro instructions in parallel for execution by the first pipeline during a next clock cycle.

Another advantage of the present invention is that many pairs of instruction can be execute in half the time over that required by a conventional microprocessor.

A further object of the invention is to provide a microprocessor that can execute large numbers of SIMD instructions much faster than has heretofore been provided.

In a further aspect, it is a feature of the present invention to provide a micro instruction pairing mechanism within a pipeline microprocessor. The micro instruction pairing mechanism includes a plurality of micro instruction buffers, pairing logic, and two micro instruction registers. The plurality of micro instruction buffers queue an ordered sequence of micro instructions for sequential execution by the pipeline microprocessor.

The plurality of micro instruction buffers has a first buffer and a second buffer. The first buffer stores a first micro instruction, where the first micro instruction is ordered to be issued for execution by a first pipeline during a next clock cycle. The second buffer stores a second micro instruction, where the second micro instruction is ordered to be issued to said first pipeline immediately after the first micro instruction during a following clock cycle. The pairing logic is coupled to the plurality of micro instruction buffers. The pairing logic pairs the first and second micro instructions so that they are both issued to said first pipeline for execution during the next clock cycle. The two micro instruction registers are coupled to the pairing logic. The two micro instruction registers receive the first and second micro instructions following pairing, and issue the first and second micro instructions in parallel for execution by said first pipeline during the next clock cycle.

A further advantage of the present invention is that instructions requiring operands from memory can execute in a single clock cycle rather than two clock cycles.

Yet another object of the present invention is to provide a method for efficiently combining back-to-back instructions within a single channel of a pipeline microprocessor.

In yet another aspect, it is a feature of the present invention to provide a method for combining micro instructions for parallel execution within a single-channel of a pipeline microprocessor. The method includes detecting, within a micro instruction queue, that a second micro instruction can be executed in parallel with a first micro instruction without causing a resource or operand conflict within the same pipeline, where the second micro instruction immediately follows the first micro instruction in the micro instruction queue; providing the first and second micro instructions in parallel to micro instruction registers; reordering micro instructions that remain in the micro instruction queue to eliminate a void created by said providing; and routing the first and second micro instructions in parallel to execution logic in the same pipeline of pipeline microprocessor.

Yet another advantage of the present invention is that time-critical applications such as speech and video applications, can be executed without experiencing unwanted delays.

BRIEF DESCRIPTION OF THE DRAWINGS

These and other objects, features, and advantages of the present invention will become better understood with regard to the following description, and accompanying drawings where:

FIG. 3 is a table illustrating execution of several pairs of non-conflicting micro instructions by the microprocessor of FIG. 2.

DETAILED DESCRIPTION

In light of the above background on techniques for executing micro instructions in a pipeline microprocessor, several related art examples will now be discussed with reference to FIGS. 1 through 3. These examples illustrate how present day pipeline microprocessors do not efficiently utilize their internal logic resources to expedite execution of back-to-back non-conflicting instructions. Following this discussion, a detailed description of the present invention will be provided with reference to FIGS. 4 through 7. Use of the present invention allows non-conflicting micro instructions to be paired and executed in parallel.

Figure 1:
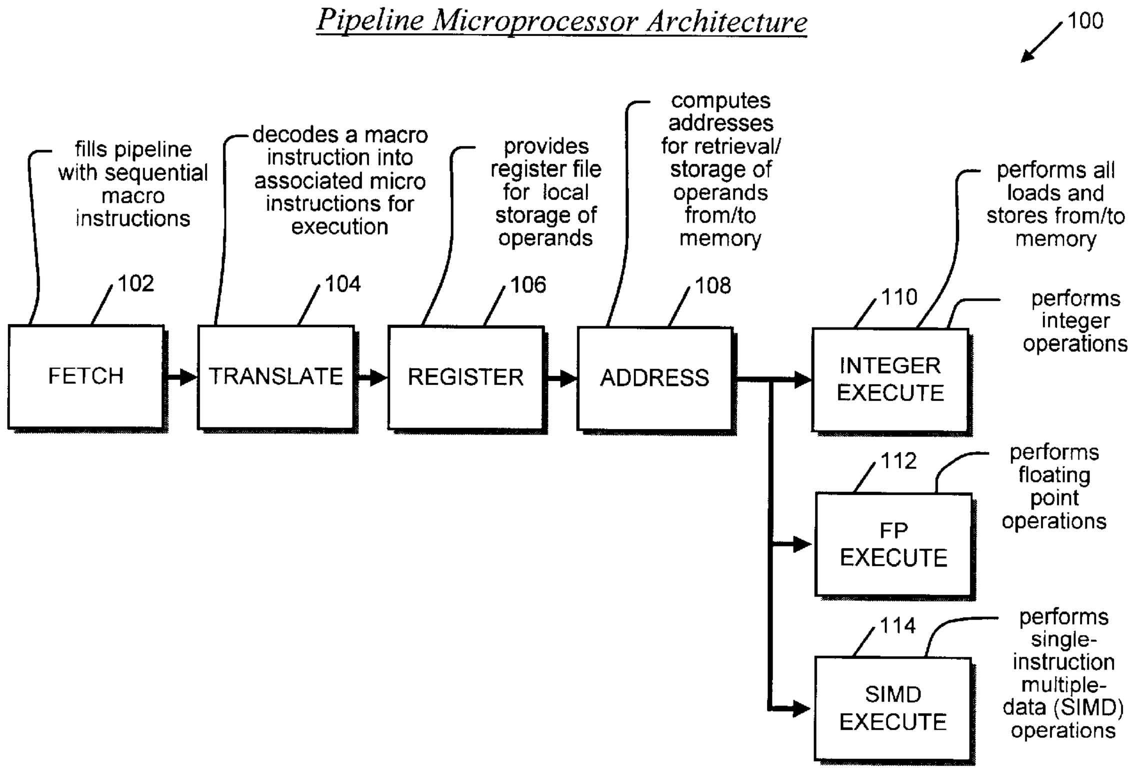
FIG. 1 is a block diagram illustrating stages of a related art pipeline microprocessor.

Referring to FIG. 1, a block diagram is presented of a present day related art pipeline microprocessor 100. The microprocessor 100 includes a fetch stage 102, translate stage 104, register stage 106, address stage 108, integer execute stage 110, floating point (FP) execute stage 112, and single-instruction multiple-data (SIMD) execute stage 114. The integer 110, FP 112, and SIMD 114 execute stages are in parallel.

Operationally, the fetch stage 102 fetches instructions from memory (not shown) that are to be executed by the microprocessor 100. The translate stage 104 sequentially translates, or decodes, the fetched instructions into associated micro instructions, each micro instruction directing logic resources within each stage of the microprocessor 100 to perform a specific subtask related to accomplishment of an operation prescribed by a fetched macro instruction. The register stage 106 retrieves operands specified by the micro instructions from a register file (not shown) for use by later stages in the pipeline. The address stage 108 calculates memory addresses specified by the micro instructions to be used in data storage and retrieval operations. The integer execute stage 110 either performs integer arithmetic logic unit (ALU) operations on data retrieved from the register file, or reads data from memory using the memory address calculated in the address stage 108, or writes data to memory using the memory address calculated in the address stage 108. Following generation of a result of an integer operation or a data read from memory, the integer execute stage 110 also updates registers in the register file. The FP execute stage 112 performs floating point operations on floating point data that has been previously loaded into floating point registers. The SIMD execute stage 114 performs SIMD operations on SIMD data that has been previously loaded into SIMD registers. Thus, macro instructions are fetched by the fetch stage 102, they are decoded into micro instructions by the translate stage 104, and the micro instructions proceed sequentially through subsequent stages 106–108 until they reach the execute stages 110, 112, 114, where they are then routed to a designated execute stage 110, 112, 114.

The above description alludes to the fact that a present day microprocessor 100 performs four fundamental types of operations: memory accesses, integer ALU operations, floating point operations, and SIMD operations. One skilled in the art will understand the differences between integer and floating point operations and their associated data types. Distinct floating point execution units 112 have existed in microprocessors 110 since the early 1990's. SIMD units 114 have only recently been incorporated into present day microprocessors 100 to address the need for computation-intensive algorithms that perform repetitive operations on large numbers of simple data types. As the name implies, a single instruction directs the microprocessor 100 to perform a single operation type, say an addition, on multiple operands or multiple pairs of operands, at the same time. In an x86-compatible microprocessor 100, instructions to perform SIMD operations are commonly referred to as MMX™ instructions (in the case of a Pentium® microprocessor) or 3Dnow!™ instructions (in the case of a K6® microprocessor). SIMD instructions allow a present day microprocessor to alleviate some of the timing bottlenecks that are associated with real-time applications such as transmission of video and speech data by allowing a programmer to specify that a single kind of operation be performed on a more than one operand. Thus, the three execute stages 110, 112, 114 are architecturally separated because their associated data types and operation types are fundamentally different. The execution stages 110, 112, 114 are provided in parallel because micro instructions that are designated for a given execution stage do not require logic resources of the other two stages for computation purposes. For example, a SIMD addition operation prescribed by a SIMD micro instruction requires logic resources only in the SIMD execution stage 114. Likewise, a floating point multiplication operation prescribed by a floating point micro instruction requires logic only in the floating point execution stage 112. To design the execution stages 110, 112, 114 in series rather than in parallel would force micro instructions destined for one of the execution stages 110, 112, 114 to proceed through the remaining two of the execution stages 110, 112, 114. Having execution stages 110, 112, 114 in parallel enables a present day microprocessor 100 to efficiently utilize execution stage logic resources.

Micro instructions move through successive stages of the microprocessor pipeline in synchronization with a microprocessor clock. Optimally, while any given stage in the pipeline is executing a micro instruction, the previous stage should be executing the next micro instruction. If a stage in the pipeline requires more than one cycle of the pipeline clock to execute a given micro instruction, flow of micro instructions through the microprocessor pipeline is momentarily stalled: preceding stages in the pipeline are precluded from forwarding associated results down the pipeline and succeeding stages, having completed execution of a current micro instruction, sit idle. A stall in the pipeline is referred to as a slip or a void. Slips cause delays when application programs execute on the microprocessor 100.

Many improvements have been developed in the art to obviate the negative effects of pipeline slips. But, in addition to reducing voids in the pipeline, microprocessor designers are now focusing on making more efficient use of logic within the pipeline, thereby allowing application programs to run faster.

By observing the distribution of micro instructions according to operation type within prevalent desktop computer application programs, the present inventors have noted several limitations that are imposed by conventional pipeline microprocessors 100. First, the design of the integer execute stage 110 is problematic because macro instructions that direct the microprocessor 100 to perform an integer operation on an operand in memory must be decoded by the translate stage 104 into two micro instructions: a first micro instruction to load the operand from memory into a temporary register, and a second micro instruction to perform the integer operation using the operand. Such macro instructions are referred to as load-ALU instructions. Load-ALU macro instructions require translation into two micro instructions because a micro instruction may direct logic resources in the integer execute stage 110 to either perform a memory access operation or an integer operation, but not both types of operations. For a single micro instruction to prescribe both operations would result in a logic resource conflict within the integer execute stage. In spite of this, one skilled in the art will concur that load-ALU instructions are ubiquitous in most present day desktop application programs.

Another limitation of present day microprocessors 100, noted in more recent times, results from the sheer numbers of SIMD instructions that are found in motion video and voice processing applications. This increased proliferation of time-critical features in application programs has precipitated timing bottlenecks within the SIMD execution stage 114. Simply put, today's desktop computer application programs exhibit a titanic number of SIMD micro instructions, all of which must be processed one-at-a-time by a single SIMD execution unit 112. And many of these instructions perform SIMD operations on different, or independent, operands. When operands required for a given SIMD instruction do not depend upon a result generated by a previous SIMD instruction, the two SIMD instructions are said to utilize independent operands, or they are said to have no operand dependencies. In addition to noting operand independence, the present inventors have observed that many SIMD micro instructions require SIMD operands to first be retrieved from memory. Yet, since memory accesses must be performed by the integer execute stage 110, execution of a load-ALU SIMD macro instruction necessitates that it be decoded by the translate stage 104 into two SIMD micro instructions: a first SIMD micro instruction to load a SIMD operand from memory and a second SIMD micro instruction to perform the prescribed SIMD operation. The first SIMD micro instruction is dispatched to the integer execute stage 110 to load the SIMD operand from memory and the second SIMD micro instruction is thereafter routed to the SIMD execute stage 114 to perform the prescribed SIMD ALU operation using the SIMD operand.

A third noted limitation regards the utilization of logic resources within stages 102–114 of the microprocessor 100 as a function of the micro instructions that are sequentially processed by the stages 102–114, particularly those logic resources in the early pipeline stages 102–108. It is readily evident to one skilled in the art that memory access operations utilize logic within the address stage 108, but ALU-related operations do not, because addresses need be generated only for memory accesses. Similarly, SIMD ALU operations require logic resources only within the SIMD execution stage 114, but do not require logic resources within the address stage 108 because SIMD ALU operations are executed totally within the SIMD execute stage 114. These are just two examples where micro instructions that prescribe the use of non-conflicting logic resources proceed inefficiently through the pipeline of a present day microprocessor. With these limitations in mind, attention is now directed to FIG. 2.

Figure 2:
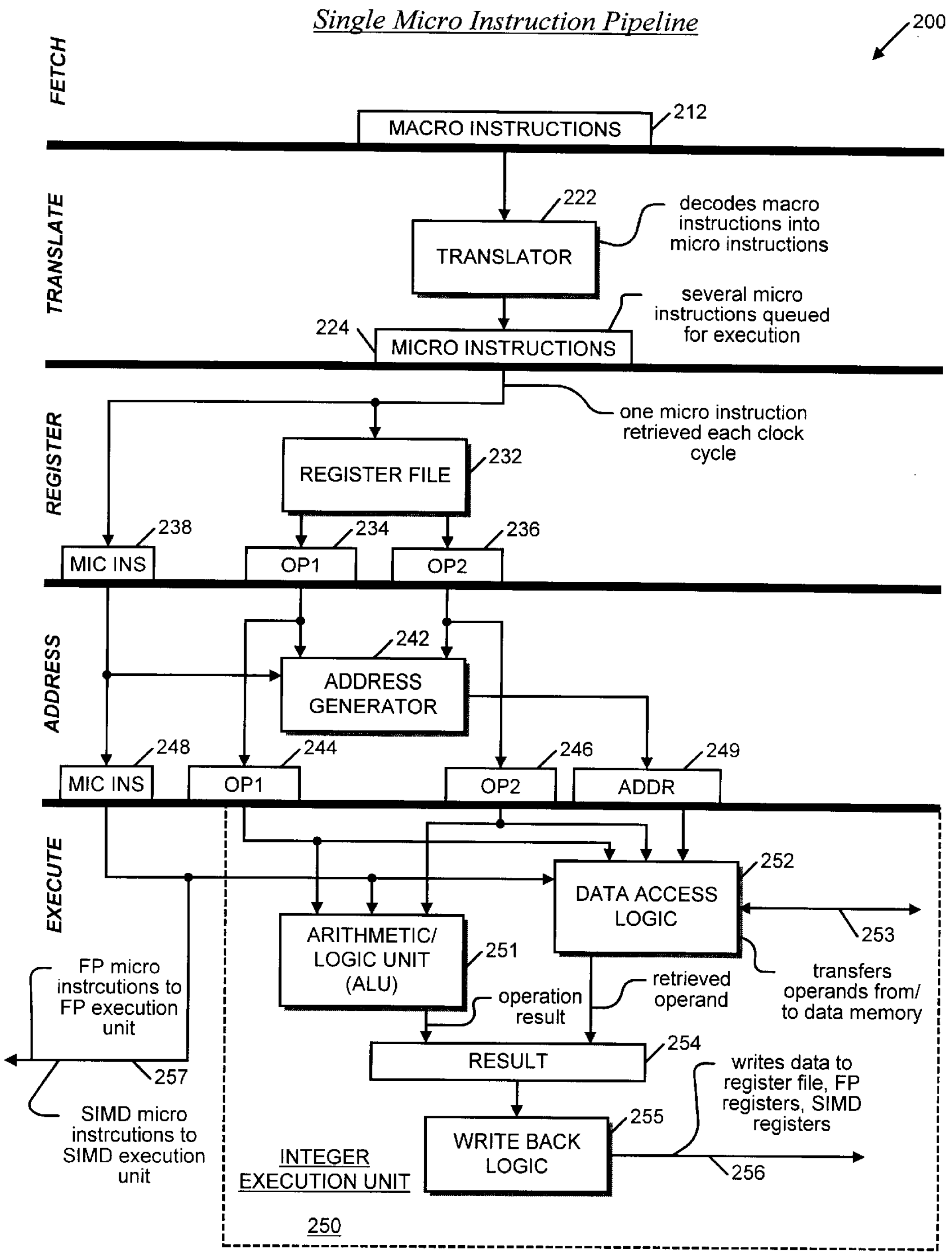
FIG. 2 is a block diagram of a related art pipeline microprocessor illustrating conventional apparatus for executing back-to-back non-conflicting micro instructions.

Referring to FIG. 2, a block diagram of a related art pipeline microprocessor 200 is presented illustrating conventional apparatus for executing back-to-back non-conflicting micro instructions. The microprocessor 200 includes logic corresponding to the pipeline stages 102–114 described with reference to FIG. 1: fetch stage logic, translate stage logic, register stage logic, address stage logic, and execute logic. Since integer, floating point, and SIMD execute stages are in parallel, for clarity of presentation, only details of an integer execution unit 250 are depicted.

The fetch stage logic includes a macro instruction buffer 212 that provides macro instructions to the translate stage logic during each clock cycle. The translate stage logic has an instruction decoder, or translator 222, that receives macro instructions provided by the instruction buffer 212. The translator 222 provides an output to a micro instruction queue 224. The register stage logic includes a register file 232 that provides outputs to a first operand register 234 and a second operand register 236. Additionally, the register stage logic routes micro instructions to the next pipeline stage via buffer 238. The address stage logic has an address generator 242 that provides an output to an address register 249. Also, the address stage logic routes micro instructions and operands to the execute stage via buffers 248, 244, and 246. Micro instructions are routed to a floating point execution unit (not shown) and a SIMD execution unit (not shown) via bus 257. The integer execution unit 250 has an ALU 251 that provides an output to a result register 254. The integer execution unit 250 also has data access logic 252 that interfaces to memory (not shown) via bus 253. Additionally, the integer execution unit 250 has write back logic 255 that provides an output via bus 256.

Operationally, macro instructions are retrieved from an instruction cache (not shown) and are buffered for subsequent translation in the macro instruction buffer 212. In synchronization with a pipeline clock signal (not shown), the macro instructions are retrieved from the buffer 212 and are provided to the translator 222. The translator 222 decodes each macro instruction into a corresponding sequence of micro instructions, which are then queued in order in the micro instruction queue 224 for execution by subsequent stages. The micro instruction to be issued during the next clock cycle is positioned at the front of the queue 224.

During each clock cycle, one micro instruction is retrieved from the micro instruction queue 224 and is provided to the register file 232. The register file 232 provides temporary storage for operands. These operands may be used directly in a computation by later stages of the microprocessor 200 to compute an address or a result, or they may be results of computations that are pending a write to memory. A micro opcode field in the micro instruction directs the register stage logic to retrieve up to two operands from prescribed locations in the register file 232. If the micro opcode so directs, these two operands are provided in the first and second operand registers 234, 236. In addition, the micro instruction itself is piped down to the address stage logic via buffer 238.

If the micro instruction directs the microprocessor 200 to read (i.e., load) or write (i.e., store) an operand from/to memory, then the address generator 242 uses address components provided by the micro instruction and the first and second operand registers 234, 236 to compute an address, or location, of the operand in memory. The address is provided to address register 249. If the micro instruction does not direct a load or a store, then the contents of buffers 238, 234, and 236 are simply piped down to the execute stage via buffers 248, 244, and 246. When a micro instruction does not direct a memory access, logic resources within the address stage are not utilized: the micro instruction simply passes through the address stage because an address computation is not required to perform the operation prescribed by the micro instruction.

In the execute stage, if the micro instruction retrieved from buffer 248 directs the microprocessor 200 to perform a floating point operation or a SIMD operation, then the micro instruction is provided to the floating point execution unit or the SIMD execution unit via bus 257. In many present day microprocessors 200, micro instructions are simply bussed in parallel to the floating point unit, SIMD unit, and the integer execution unit 250. Consequently, the execution units must then evaluate micro opcodes within all micro instructions to determine if they are required to perform any associated operations. Whether routed by designation or whether routed in parallel, micro instructions are provided to the integer execution unit 250. If a load operation or a store operation is prescribed by a micro instruction, then the address computed in the previous stage is retrieved from the address register 249 and is provided to the data access logic 252. The micro opcode field of the micro instruction directs the data access logic 252 to either load an operand from the location in memory (not shown) or to store one of the two operands provided in buffers 244, 246 to the location in memory. The memory, or data cache, is accessed via bus 253. An operand that is loaded from memory is provided to the result register 254. If, however, a micro instruction directs that an integer ALU operation be performed, then the two operands from buffers 244 and 246 are provided to the integer ALU 251. The ALU 251 performs the prescribed operation using the contents of buffers 244, 246 and generates a result of the operation in the result register 254.

The write back logic 255 retrieves the result from the result register 254 and, if so directed by the micro instruction, writes the result to a destination register, in the register file 232. Although floating point registers and SIMD registers typically reside in the floating point execution unit and SIMD execution unit, write back logic 255 typically possesses the capability to write operands that have been retrieved from memory to both FP and SIMD registers. In addition, data from FP and SIMD units that is to be written to memory typically is transferred first to a temporary register in the register file 232 by one micro instruction and then retrieved from the temporary register and stored to a memory location by a following micro instruction.

It is important to reiterate that the integer execution unit 250 in a conventional microprocessor 200 only allows a micro instruction to prescribe a data access operation or an integer ALU operation, but not both. In addition, a prescribed data access operation can be either a load or a store, but cannot be both a load and a store. As a result, a load-ALU macro instruction must be decoded into more than one micro instruction in order to execute to completion in accordance with to the limitations imposed by integer execute stage architecture. These limitations apply not only to integer load-ALU instructions, but also to SIMD load-ALU instructions, and ALU (integer or SIMD) instructions that require storage of a result to memory. Such instructions are generally known as ALU-store instructions.

Because memory accesses are constrained to occur in the integer execution unit 250, one skilled in the art will observe that logic resources within the integer execution unit 250 are efficiently utilized only if back-to-back micro instructions perform memory loads, integer ALU operations, or memory stores. But when memory accesses are being performed by the integer execution unit 250, the floating point unit and SIMD unit sit idle. In a present day application program, back-to-back micro instructions may direct a variety of operation types, several of which are presented in FIG. 3.

Now referring to FIG. 3, a table 300 is presented illustrating execution of several pairs of non-conflicting micro instructions by the microprocessor 200 of FIG. 2. For clarity, activity for each of the pairs is described only through the register stage of the microprocessor 200. The column entitled Fetch depicts either a pair of x86-compatible macro instructions or a single x86-compatible macro instruction. The macro instructions proceed through the translate stage and are translated therein into corresponding micro instructions, which are placed in the micro instruction queue 224. Micro instructions are subsequently issued sequentially to the register stage in synchronization with a pipeline clock. Execution of the micro instruction pairs by the microprocessor 200 is described with reference to cycles of the pipeline clock. Instructions before and after instructions of interest are designated by "***".

During cycle 1, an integer add macro instruction, ADD AX,BX proceeds through the fetch stage of the microprocessor 200. The integer add micro instruction directs the microprocessor to retrieve operands from registers AX and BX in the register file 232, to perform an integer addition using the two operands, and to store the addition result in register AX in the register file 232. In x86-compatible parlance, register BX is referred to as the source and register AX is referred to as the destination, or target. The macro instruction is placed in the macro instruction buffer 212 by fetch stage logic so that it can be decoded by translate stage logic during the following clock cycle.

During cycle 2, ADD AX,BX proceeds through the translate stage of the microprocessor 200. Therein, it is decoded into an integer add micro instruction, ADD AX,BX, to accomplish the prescribed operation. The integer add micro instruction is placed in the micro instruction queue 224 so that it may be issued during the next clock cycle. Also during cycle 2, an integer load macro instruction, MOV BX, [CX] proceeds through the fetch stage. The integer load macro instruction directs the microprocessor 200 to retrieve an operand from a memory location prescribed by the source register, CX, and to load the operand into destination register BX. The integer load macro instruction is placed in the macro instruction buffer 212.

During cycle 3, the integer add micro instruction, ADD AX,BX, is issued to register stage logic wherein operands from registers AX and BX in the register file 232 are retrieved and provided in buffers 234 and 236. Also during cycle 3, the load macro instruction proceeds through the translate stage, wherein it is translated into a load micro instruction, LD BX,[CX]. The load micro instruction directs the microprocessor to retrieve the operand from the memory location prescribed by the source register CX and to write the operand to target register BX in the register file 232. The load micro instruction is placed in the micro instruction queue 224.

During cycle 4, the integer add micro instruction proceeds to the address stage (not shown) and the load micro instruction proceeds through the register stage. In the register stage, an address component is retrieved from source register CX and is provided to operand buffer 234. In the address stage, the address component is used to generate an address of the memory location for the load operation.

The instruction pair scenario described with reference to cycles 1 through 4 illustrates that two micro instructions, and correspondingly two cycles of the pipeline clock, are required to execute an integer ALU operation followed by an integer load operation. This is due to the fact that the integer execution unit 250 can only perform a data access operation or an integer ALU operation during a single clock cycle, but not both types of operations. Also, it is significant to note that the back-to-back micro instructions issued during cycles 3 and 4 utilize conflicting logic resources, i.e., both micro instructions utilize logic within the integer execution unit 250. In addition, the second micro instruction in the back-to-back pair, LD BX,[CX], prescribes source and destination operands that are not dependent upon execution of the first micro instruction ADD AX,BX. The destination of the first micro instruction is register AX, which is not prescribed as either a source or destination for the second micro instruction. Hence, the micro instruction pair described with reference to cycles 3 and 4 employ independent operands, yet they utilize conflicting logic resources.

Another back-to-back micro instruction execution scenario that has been observed begins in cycle 5. During cycle 5, a load-ALU macro instruction, ADD AX,[BX], proceeds through the fetch stage. The load-ALU macro instruction directs the microprocessor 200 to retrieve an operand from a memory location prescribed by source register BX, to add the operand to the contents of destination register AX, and to place a result of the addition in destination register AX.

During cycle 6, the load-ALU instruction proceeds through the translate stage wherein it is translated into a load micro instruction followed by an ALU micro instruction. Both micro instructions in the pair are placed in the micro instruction queue 224.

During cycle 7, the load micro instruction, LD T1,[BX], is provided to register stage logic. The load micro instruction directs the microprocessor 200 to retrieve the operand from the memory location prescribed by source register BX and to temporarily store the operand in destination register T1 in the register file 232. Consequently, during cycle 7, address components corresponding to the memory location are retrieved from source register BX and are provided in operand register 236.

During cycle 8, the load micro instruction proceeds through the address stage of the microprocessor 200 wherein an address for the memory location is generated using contents of register 236. In addition during cycle 8, the ALU micro instruction, ADD AX,T1, proceeds through the register stage. The ALU micro instruction directs the microprocessor to retrieve the contents of source register T1 and destination register AX, then to perform an addition operation, and to store the addition result in destination register AX. Consequently, during cycle 8, contents of AX and T1 are retrieved from the register file 232 and are place in operand registers 234 and 236.

The instruction pair scenario described with reference to cycles 5 through 8 illustrates that two micro instructions, and correspondingly two cycles of the pipeline clock, are required to execute an integer load operation followed by an integer ALU operation. This translation of a single macro instruction into two micro instructions results also from the fact that the integer execution unit 250 can only perform a data access operation or an integer ALU operation during a single clock cycle, like the scenario described with reference to cycles 1 through 4. Also, the back-to-back micro instructions issued during cycles 7 and 8 utilize conflicting integer stage logic resources. In addition, no operand dependencies exist between the second micro instruction in the back-to-back pair, ADD AX,T1 and the first micro instruction in the pair, LD T1,[BX]. Hence, the micro instruction pair described with reference to cycles 7 and 8 employ independent operands, yet they utilize conflicting logic resources.

Cycles 9 through 12 illustrate a third back-to-back micro instruction pair execution scenario, beginning with fetching of a load macro instruction, MOV AX, [CX], during cycle 9.

During cycle 10, the load macro instruction is provided to the translator 222 where it is decoded into a load micro instruction. The load micro instruction is placed in the micro instruction queue 224. Also during cycle 10, a SIMD ALU macro instruction, PADDD M1,M2, proceeds through the fetch stage. The SIMD ALU macro instruction directs the microprocessor to add multiple operands contained within SIMD source register M1 to corresponding multiple operands contained within SIMD destination register M2, and to place the multiple results of the additions in SIMD destination register M1. The SIMD ALU macro instruction is placed in the macro instruction buffer 212.

During cycle 11, the load micro instruction is retrieved from the micro instruction queue and is proceeds through the register stage, retrieving contents of source register BX. Also during cycle 11, the SIMD ALU macro instruction proceeds through the translate stage wherein it is decoded into a corresponding SIMD ALU micro instruction. The SIMD ALU micro instruction is placed in the micro instruction queue 224.

During cycle 12, the load micro instruction proceeds through the address stage and the SIMD ALU micro instruction proceeds through the register stage.

The instruction pair scenario described with reference to cycles 9 through 12 illustrates that two micro instructions, and correspondingly two cycles of the pipeline clock, are required to execute an integer load operation followed by a SIMD ALU operation. But unlike the two examples described above, this back-to-back pair of micro instructions are non-conflicting with respect to both logic resources and operands. Entirely independent operands are prescribed for both micro instructions in the pair and furthermore, the SIMD ALU instruction will simply pass through the address stage because no address calculation is required. Furthermore, although the load micro instruction requires an address calculation, its function, memory access, is to be performed by the integer execution unit 250.

During cycles 13 through 16, another execution scenario is presented for two back-to-back micro instructions. This scenario involves execution of a SIMD load micro instruction, LD M1,[BX], followed by a SIMD ALU micro instruction PADDD M2,M3. The SIMD load micro instruction is issued to the register stage during cycle 15 and the SIMD ALU micro instruction is issued to the register stage during cycle 16. The SIMD load micro instruction in fact is executed by the integer execution unit 250 because a memory access is required to load destination register M1. As can be additionally determined from their composition, the two micro instructions in the pair are non-conflicting with respect to both logic resources and operands.

During cycles 17 through 20, a further execution scenario is presented for two back-to-back micro instructions. This scenario involves execution of an integer ALU micro instruction, ADD AX,BX, followed by a SIMD ALU micro instruction PADDD M1,M2. The integer ALU micro instruction is executed by the integer execution unit 250 and the SIMD ALU micro instruction is executed by the SIMD execution unit. As depicted, the two micro instructions in the pair are non-conflicting with respect to both logic resources and operands.

During cycles 21 through 24, yet another execution scenario is presented for two back-to-back micro instructions. This particular scenario involves execution of a first SIMD ALU micro instruction, PADDD M1,M2, followed by a second SIMD ALU micro instruction PADDD M3,M4. Both micro instructions must be executed by the SIMD execution unit, albeit that no operand dependencies exist between the two micro instructions. But since a conventional microprocessor 200 only has one SIMD execution unit, the two micro instructions prescribe the use of conflicting resources and must therefore be executed sequentially. As depicted, the two micro instructions in the pair are non-conflicting with respect to both logic resources and operands.

The six back-to-back micro instruction execution scenarios presented in the table 300 illustrate only a few of the numerous instances where back-to-back micro instructions proceed inefficiently through stages of a conventional microprocessor 200, either because of operational limitations imposed by the integer execution unit 250 or because a conventional microprocessor 200 has only a single micro instruction pipeline with commensurate single-channel execution units.

One skilled in the art will appreciate that performance improvements can be obtained by executing non-conflicting micro instructions in parallel. Such improvements could be acquired by providing two parallel paths from the fetch stage through the execute stage. But replication and arbitration of translation, register, and address generation logic would add overwhelming cost, power consumption, and complexity. The present inventors have noted that the inefficiencies alluded to above are chiefly driven by the specific design of execution stage logic, rather than upon the design of logic within upper stages. One skilled in the art will concur that any improvement in micro instruction throughput that does not come at the expense of increased cost, complexity, or power requirements is highly desirable.

The present invention overcomes the limitations of conventional, single-pipeline microprocessors by providing a dual-instruction path so non-conflicting micro instructions can execute in parallel through a single-channel pipeline. In addition, the present invention separates data access logic for loading operands from ALU logic in the execute stage so that separate micro instructions are not required anymore to perform load-ALU operations. Furthermore, the present invention provides an additional SIMD execution unit in parallel with other execution units to overcome the timing bottleneck caused by extensive use of SIMD instructions in today's application programs. Finally, to obviate the need for complex and costly duplication of translate, register, and address stage logic, the present invention controls the pairing of instructions for parallel, or concurrent, execution at the micro instruction level rather than at the macro instruction level. Only non-conflicting pairs of micro instructions are combined for parallel execution. The present invention is described with reference to FIGS. 4 through 7.

Figure 4:
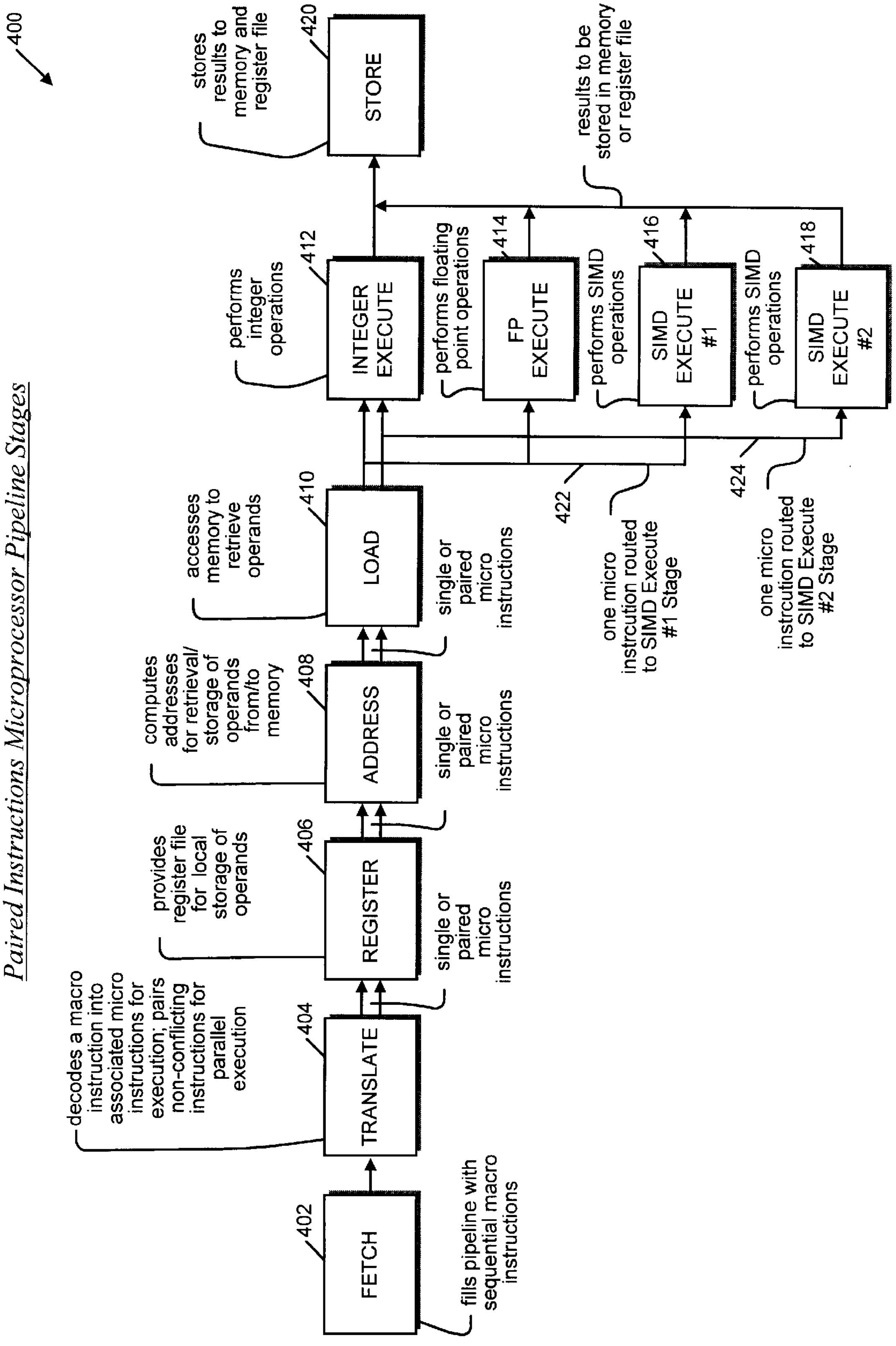
FIG. 4 is a block diagram illustrating pipeline stages of a microprocessor according to the present invention.

Referring to FIG. 4, a block diagram is presented illustrating pipeline stages of a microprocessor 400 according to the present invention. Like the microprocessor 100 described with reference to FIG. 1, the microprocessor 400 according to the present invention includes a fetch stage 402, translate stage 404, register stage 406, and address stage 408. In contrast to a conventional microprocessor 100, however, the microprocessor 400 according to the present invention includes a load stage 410 that is separate from an integer ALU execute stage 412. In addition to a floating point stage 414 and a SIMD stage 416 being in parallel with the integer execute stage 412, the present invention has incorporated an additional SIMD execute stage 418. Results from the four execute stages 412–418 to be stored in memory are provided to a store stage 420. A dual micro instruction path is provided out of the translate stage 404 through the load stage. The dual path is separated into two parallel paths 422, 424 that primarily allow concurrent distribution of parallel SIMD micro instructions to the two SIMD execute stages 416, 418.

Operationally, the fetch stage 102, translate stage 404, register stage 406, and address stage 408, function like that of the conventional microprocessor 100 described with reference to FIG. 1, the difference being that two micro instructions are presented in parallel for execution by the register stage 406 and address stage 408, rather than a single micro instruction. The load stage 410 accesses memory using an address provided by the address stage 408 to retrieve operands. Following the load stage 410, two parallel micro instructions are distributed as shown between the four execute stages 412–418 as shown. One of the micro instructions is routed to the integer execute stage 412, the floating point execute stage 414, and the first SIMD execute stage 416 via bus 422. The other micro instruction is routed to the integer execute stage 412 and to the second SIMD execute stage 418. The four execute stages 412–418 like their counterparts 110–114 described with reference to FIG. 1, except that the integer stage 412 no longer performs memory access operations. And because only memory load operations are performed by the load stage 410, an additional store stage 420 has been added to provide for writes of results and register operands to memory.

Figure 5:
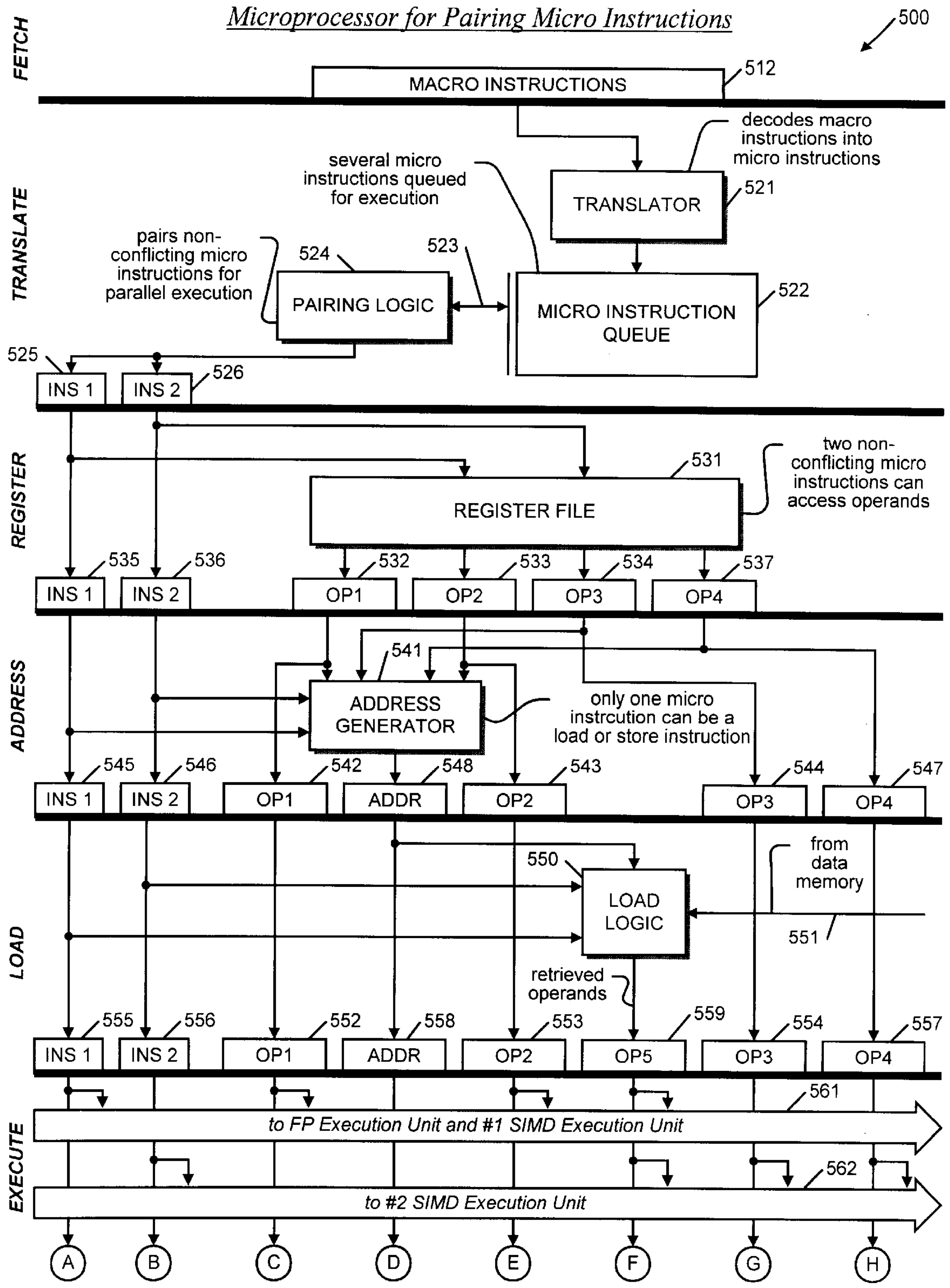
FIG. 5 is a block diagram of the microprocessor according to the present invention featuring apparatus for executing pairs of non-conflicting micro instructions in parallel.

Now referring to FIG. 5, a block diagram is presented of the microprocessor 500 according to the present invention featuring apparatus for concurrently executing pairs of non-conflicting micro instructions in parallel. The microprocessor 500 references logic stages corresponding to the ten pipeline stages 402–420 described with reference to FIG. 4. The microprocessor has fetch stage logic, translate stage logic, register stage logic, address stage logic, load stage logic, integer execute stage logic, SIMD #1 execute stage logic (not shown), SIMD #2 execute stage logic (not shown), floating point executed stage logic (not shown), and store stage logic. For clarity only interfaces to the floating point and SIMD execute stages are shown.

The fetch stage logic includes a macro instruction buffer 512 that provides macro instructions to the translate stage logic during each clock cycle. The translate stage logic has an instruction decoder 521, or translator 521, that receives macro instructions provided by the instruction buffer 512. The translator 521 provides an output to a micro instruction queue 522. The translate stage logic also has pairing logic 524, or an instruction combiner 524, that interfaces to the micro instruction queue 522 via bus 523. The pairing logic 524 provides an output to a first micro instruction register 525 and a second micro instruction register 526. The first and second micro instruction registers 525, 526 are in parallel. The register stage logic includes a register file 531 that provides outputs to a first operand register 532, a second operand register 533, a third operand register 534, and a fourth operand register 537. In one embodiment, the register file 531 is a primary dual-port register file that is complimented by a dual-port shadow register file, thus providing four read ports. The dual-port shadow register file maintains a copy of the contents of the primary dual-port register file. In another embodiment, the register file 531 is a true 4-port register structure. Additionally, the register stage logic concurrently routes two parallel micro instructions to the next pipeline stage via buffers 535, 536. The address stage logic has an address generator 541 that provides an output to an address register 548. Also, the address stage logic routes micro instructions and operands to the load stage via buffers 542–547. The load stage logic includes load logic 550 that receives inputs from both micro instruction buffers 545, 546 and the address register 548. The load logic 550 is coupled to memory (not shown) via bus 551. The load logic provides an output to operand register 559. In addition, the load stage logic routes the two parallel micro instructions, the address, and operands to execute stage logic via buffers 552–559.

Following the load stage, a first micro instruction and associated operands are dispatched from buffers 555, 552, 553, and 559 to an integer execution unit 590, a floating point execution unit (not shown) and a SIMD #1 execution unit (not shown). A second micro instruction and associated operands is concurrently routed from buffers 556, 559, 554, and 557 to the integer execution unit 590 and a SIMD #2 execution unit (not shown). The integer execution unit 590 includes an integer ALU 570. The integer ALU 570 provides a result to result register 571. Also, the integer execution logic routes the two parallel micro instructions, the address, and operands to store stage logic via buffers, 572–579. The store stage has store logic 581 that receives inputs from the two micro instruction buffers 575, 576, address buffer 578, and four operand registers 572, 573, 574, 577. In addition, the store logic 581 receives data from the floating point and SIMD execution units via bus 585. The store logic 581 is coupled to memory via bus 582. In addition the store stage has write back logic 583 that receives inputs from two parallel micro instruction buffers 575, 576, bus 585, result register 571, and operand register 579. The write back logic 583 interfaces to the register file 531 via bus 584.

Operationally, macro instructions are retrieved from an instruction cache (not shown) and are buffered for subsequent translation in the macro instruction buffer 512. In synchronization with a pipeline clock signal (not shown), the macro instructions are retrieved from the buffer 512 and are provided to the translator 521. The translator 521 decodes each macro instruction into a corresponding sequence of micro instructions, which are then queued in order in the micro instruction queue 522 for execution by subsequent pipeline stages. The micro instruction to be issued during the next clock cycle is positioned at the front of the queue 522.

In contrast to a conventional microprocessor, the microprocessor according to the present invention can execute two back-to-back non-conflicting micro instructions in parallel. As discussed above, two micro instructions are non-conflicting if 1) there are no operand dependencies between the two back-to-back micro instructions, and 2) there are no resource conflicts between the two back-to-back micro instructions. Hence, not every two back-to-back micro instructions in the micro instruction queue 522 can be paired for concurrent execution. Thus, the pairing logic 524 evaluates the contents of the micro instruction queue 522 via bus 523 during each clock cycle to determine if a first micro instruction, i.e., the micro instruction at the front of the queue, can be combined with a second, or immediately following micro instruction. If the two back-to-back micro instructions can be paired, then the pairing logic 524 places the first micro instruction in the first micro instruction register 525 and the second micro instruction in the second micro instruction register 526. Hence, during the next clock cycle, both the first and second micro instructions will be retrieved by the register stage logic from registers 525, 526 and executed in parallel. If the two back-to-back micro instructions in the micro instruction queue 522 cannot be paired, i.e., they exhibit logic resource conflicts or operand dependencies, then the pairing logic 524 places only the first micro instruction in the first micro instruction register 525 during the current clock cycle and places the second micro instruction in the first micro instruction register 525 during the following clock cycle. The pairing logic 524 determines whether micro instructions are combined for parallel execution or whether they will be executed one-at-a-time, in sequence.

During each clock cycle, contents of both micro instruction registers 525, 526 are retrieved and are provided to the register file 531. If the micro opcode corresponding to the first micro instruction so directs, two operands are provided in the first and second operand registers 532, 533. If the micro opcode corresponding to the second micro instruction so directs, two operands are provided in the third and fourth operand registers 534, 537. In addition, the first and second micro instructions are piped in parallel down to the address stage logic via buffers 535, 536.

The address generator 541 functions like the address generator 242 described with reference to FIG. 2, with the exception that logic is provided to mux inputs corresponding to either the first or second micro instruction, but not both micro instructions. It is significant to note that cost, complexity, and power are conserved because the address generator according to the present invention can calculate only one address. Only one of the two micro instructions provided by buffers 535 and 536 may direct a memory access operation. Thus, the pairing logic 524 precludes pairing of back-to-back micro instructions where both of the micro instructions prescribe memory access operations. The address that is generated for a memory access operation is provided in the address register 548. In addition, the two micro instructions and corresponding operands are piped down to load stage logic via buffers 545, 546, 542, 543, 544, and 547.

In the load stage, if either the first micro instruction or the second micro instruction directs the microprocessor 500 to perform a load operation, then the address computed in the previous stage is retrieved from the address register 548 and is provided to the load logic 550. An operand prescribed by the load operation is retrieved by the load logic 550 from memory via bus 551. The retrieve operand is provided to register 559. In addition, micro instructions, operands, and the address are piped down to the execute stage via buffers 552–558. As with the address stage logic, design of the load stage allows only one of the two parallel micro instructions to prescribe a load operation.

Following the load stage, the first and second micro instructions and associated operands are distributed via bus 561 and bus 562 to the floating point unit, the first SIMD execution unit, and the second SIMD execution unit. In one embodiment, both SIMD execution units are identical. In addition, the first and second micro instructions are routed in parallel to the integer execution unit 590. Each of the execution units is capable of executing operations prescribed by only one of the two micro instructions. Hence, the pairing logic 524 will not pair back-to-back micro instructions where both of the micro instructions prescribe integer ALU operations. But micro instructions that prescribe an integer ALU operation and a SIMD ALU operation are paired. Similarly, because the present invention has two SIMD execution units, micro instructions directing back-to-back SIMD ALU operations are paired, if they do not have operand dependencies. Furthermore, because load stage logic is now separate from execute stage logic, back-to-back micro instructions prescribing a memory access operation (i.e., load or store) and an ALU operation are combined.

In the integer execution unit 590, if one of the two micro instructions directs that an integer ALU operation be performed, then the corresponding operands are made available to the ALU 570. If prescribed by the first micro instruction, the ALU 570 performs the operation using the contents of buffers 552, 553 and 559. If prescribed by the second micro instruction, the ALU 570 performs the operation using the contents of buffers 554, 557 and 559. The ALU 570 generates a result of the operation in the result register 571. In addition, micro instructions, operands, and the computed address are piped down to the store stage in buffers 572–578.

The store logic 571 retrieves the result register 571, the four operand buffers 572, 573, 574, 577, the address register 578, and data from the FP and SIMD units via bus 585. If one of the micro instructions provided via buffers, 575, 576 so directs, then the store logic writes either the 20 result or one of the prescribed operands or data from bus 585 to memory at the address contained in buffer 578. The memory is accessed via bus 582. In addition to data storage, the store stage performs write back operations to registers in the register file 531 via write back logic 583. The write back logic 583 retrieves data from the result buffer 571, operand buffer 579, and bus 585 and, if so directed by the first or second micro instructions, performs writes to prescribed destination registers in the register file 531.

The present invention provides a technique to increase throughput by first exploiting existing untapped capabilities of a single-channel pipeline microprocessor. Only the logic required to pair and forward frequently observed back-to-back micro instruction pairs is required. In addition, replication of a SIMD execution unit alleviates timing bottlenecks caused by more recent application programs that rely heavily on SIMD operations. Furthermore, pairing of many back-to-back memory access/ALU pairs is now provided for in the present invention because memory access logic is not within the same stage of as execute logic.

Figure 6:
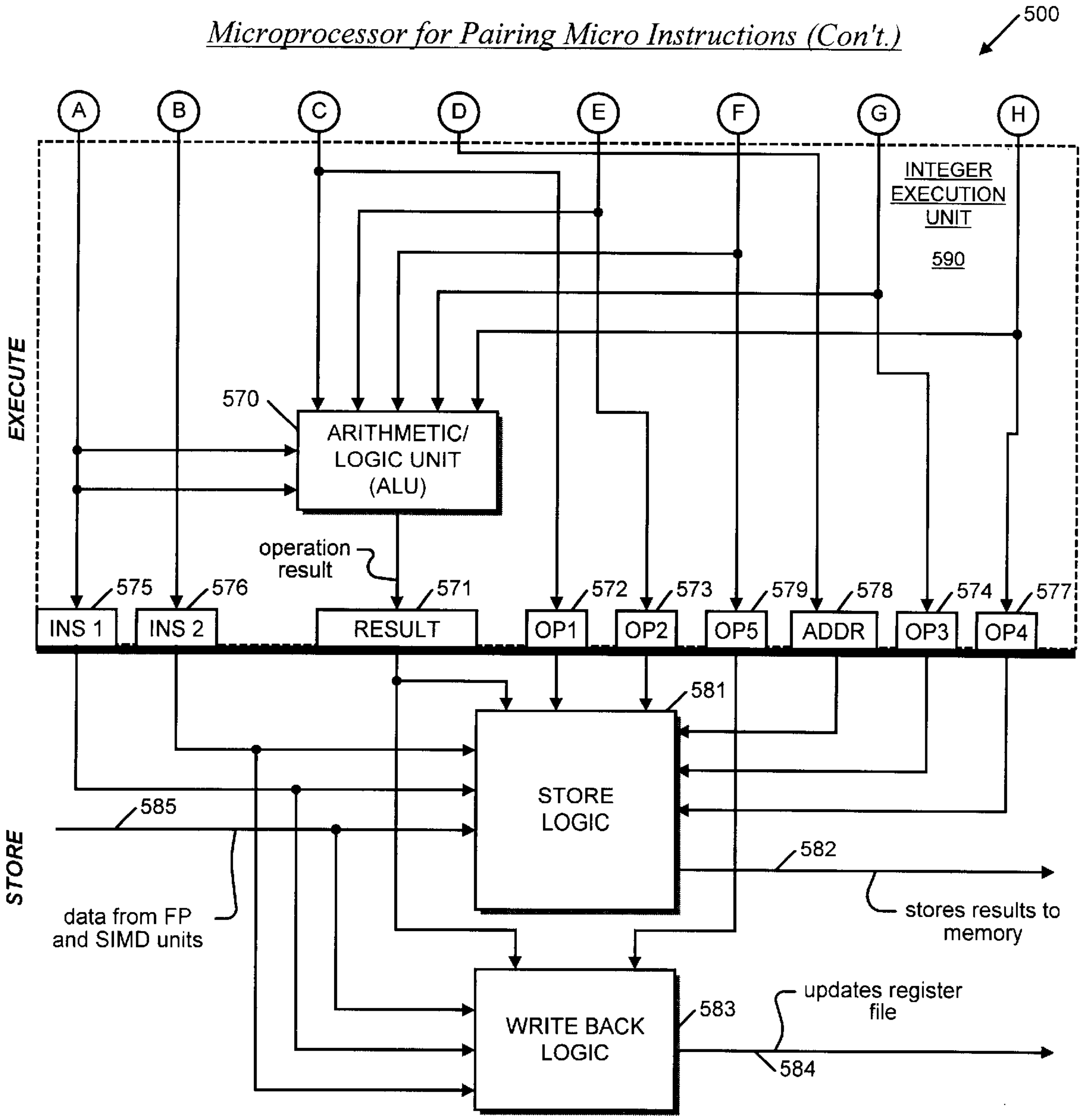
FIG. 6 is a table illustrating execution of several pairs of non-conflicting micro instructions by the microprocessor of FIG. 5.

Now referring to FIG. 6, a table 600 is presented illustrating execution of several pairs of non-conflicting micro instructions by the microprocessor 500 of FIG. 5. The pairs of non-conflicting micro instructions shown in the table 600 are the same pairs as are described with reference to FIG. 3 above. As with FIG. 3, for clarity, activity for each of the pairs is described only through the register stage of the microprocessor 400. The column entitled Fetch depicts either a pair of x86-compatible macro instructions or a single x86-compatible macro instruction. The macro instructions proceed through the translate stage and are translated therein into corresponding micro instructions, which are placed in the micro instruction queue 522. However, in contrast to a conventional microprocessor, pairing logic 524 in the microprocessor 500 according to the present invention combines the micro instructions for parallel execution. Hence, paired micro instructions are issued to the register stage in synchronization with a pipeline clock. Execution of the micro instruction pairs by the microprocessor 500 is described with reference to cycles of the pipeline clock. Instructions before and after instructions of interest are designated by "***".

Execution of the instructions by the fetch stage logic and translation logic by the microprocessor 500 according to the present invention is like that described with respect to FIG. 3. The differences, discussed below, result from combination back-to-back micro instructions by the pairing 20 logic 524 and subsequent concurrent issue of paired micro instructions to register stage logic. The following discussion highlights the differences as seen by the register stage logic.

During cycle 4, a first micro instruction pair is issued in parallel to register stage logic. A first micro instruction, ADD AX,BX, is issued from register 525 and a second micro instruction, LD BX,[CX], is issued from register 526. Pairing logic 524 evaluated these two micro instructions during cycle 3 and determined that they were non-conflicting micro back-to-back micro instructions. More specifically, the first micro instruction prescribes an integer ALU operation and the second micro instruction prescribes a load operation, thus the pair utilizes non-conflicting logic resources in the microprocessor 500. In addition, since the target for the first instruction, register AX, is not required for either target or source by the second instruction, no operand dependencies exist. As a result, this first instruction pair takes one cycle to execute in parallel as opposed to the two cycles required to execute on a conventional microprocessor 200.

As shown in FIGS. 3 and 6, execution of the first micro instruction pair is completed through the register stage by both a conventional microprocessor 200 and the microprocessor 500 according to the present invention. However, this appearance simply results from the manner in which instructions are shown to be fetched and translated in synchronization with the pipeline clock in both tables 300, 600. One skilled in the art will appreciate that virtually all microprocessor fetch multiple instructions during a single clock cycle and that present day instruction decoders also generate multiple micro instructions during a single clock cycle. Hence, the 1-cycle savings depicted in cycle 4 of the table 600 represents a true throughput improvement.

During cycle 6, a second micro instruction pair is issued in parallel to register stage logic. LD T1,[BX], the first micro instruction in the second pair, is issued from register 525 and ADD AX,T1, the following micro instruction in the second pair, is issued from register 526. Pairing logic 524 evaluated these two micro instructions during cycle 6 and determined that they were non-conflicting. More specifically, the LD T1,[BX] prescribes a load operation and ADD AX,T1 prescribes an integer ALU operation, thus the second pair utilizes non-conflicting logic resources in the microprocessor 500. However, the target for the first instruction, register T1, is required for as a source by the second instruction. By a strict definition, operand dependencies exist, however, these two micro instructions are combined by pairing logic 524 because load-ALU pairings are allowed when a first instruction target is used as a source for a second instruction. The combination of integer load-ALU, integer ALU-store, and integer load-ALU-store micro instructions are specifically discussed in copending U.S. patent application Ser. No. 09/313,908, entitled PAIRING OF LOAD-ALU-STORE WITH CONDITIONAL BRANCH, having a common inventor and having the same assignee, which is hereby incorporated by reference. Execution of the second pair of micro instructions requires only one cycle of the pipeline clock.

During cycle 12, a third micro instruction pair is issued in parallel to register stage logic. LD AX,[CX], the first micro instruction in the third pair, is issued from register 525 and PADDD M1,M2, the following micro instruction in the third pair, is issued from register 526. Pairing logic 524 evaluated these two micro instructions during cycle 11 and determined that they were non-conflicting. More specifically, the LD AX,[CX] prescribes a load operation and PADDD M1,M2 prescribes a SIMD ALU operation, thus the third micro instruction pair utilizes non-conflicting logic resources in the microprocessor 500. In addition, since the target for the first instruction, register AX, is not required for either target or source by the second instruction, no operand dependencies exist. As a result, this third instruction pair takes only one cycle to concurrently execute.

During cycle 16, a fourth micro instruction pair is issued in parallel to register stage logic. LD M1,[BX], the first micro instruction in the fourth pair, is issued from register 525 and PADDD M2,M3, the second micro instruction in the fourth pair, is issued from register 526. Pairing logic 524 evaluated these two micro instructions during cycle 15 and determined that they were non-conflicting. More specifically, the LD M1,[BX] prescribes a SIMD load operation and PADDD M2,M3 prescribes a SIMD ALU operation, thus the fourth micro instruction pair utilizes non-conflicting logic resources in the microprocessor 500. In addition, since the target for the first instruction, register M1, is not required for either target or source by the second instruction, no operand dependencies exist. As a result, this fourth instruction pair takes only one cycle to concurrently execute.

During cycle 20, a fifth micro instruction pair is issued in parallel to register stage logic. ADD AX,BX, the first micro instruction in the fifth pair, is issued from register 525 and PADDD M1,M2, the second micro instruction in the fifth pair, is issued from register 526. Pairing logic 524 evaluated these two micro instructions during cycle 19 and determined that they were non-conflicting. More specifically, the ADD AX,BX prescribes an integer ALU operation and PADDD M1,M2 prescribes a SIMD ALU operation, thus the fifth micro instruction pair utilizes non-conflicting logic resources in the microprocessor 500. Also, since the target for the first instruction, register AX, is not required for either target or source by the second instruction, no operand dependencies exist. As a result, this fifth instruction pair takes only one cycle to concurrently execute.

During cycle 24, a sixth micro instruction pair is issued in parallel to register stage logic. PADDD M1,M2, the first micro instruction in the sixth pair, is issued from register 525 and PADDD M3,M4, the second micro instruction in the sixth pair, is issued from register 526. Pairing logic 524 evaluated these two micro instructions during cycle 23 and determined that they were non-conflicting. More specifically, the PADDD M1,M2 prescribes a SIMD ALU operation and PADDD M3,M4 prescribes another SIMD ALU operation. But, since the microprocessor 500 according to the present invention has two parallel SIMD execution units, back-to-back SIMD ALU instructions having non-dependent operands can be paired for execution. As a result, this sixth instruction pair takes only one cycle to concurrently execute.

Figure 7:
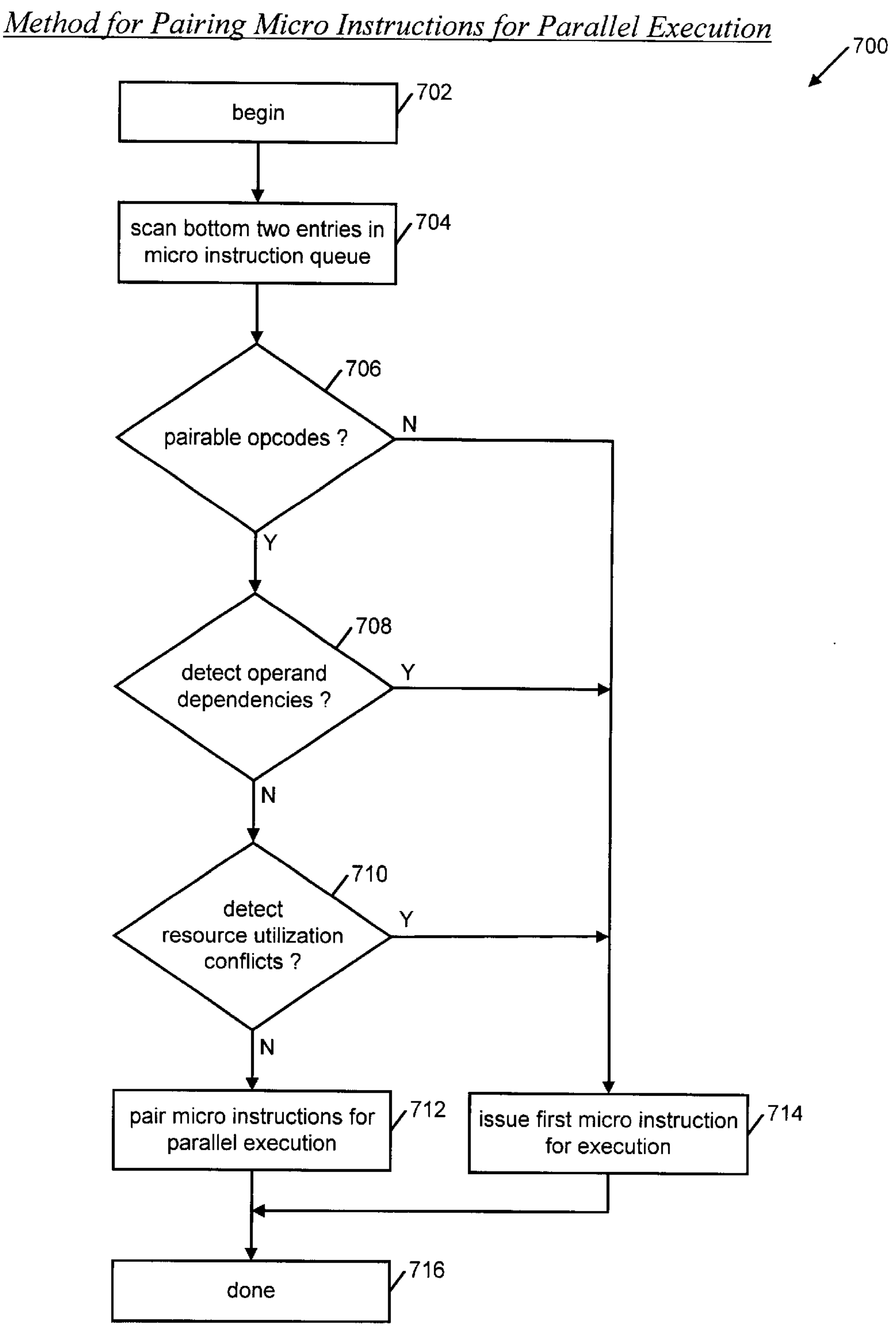
FIG. 7 is a flow chart of a method according to the present invention for pairing micro instructions for parallel execution by a pipeline microprocessor.

Now referring to FIG. 7, a flow chart 700 is presented illustrating a method according to the present invention for pairing non-conflicting micro instructions for parallel execution by a pipeline microprocessor.

Flow begins at block 702, wherein an instruction decoder in a microprocessor translates macro instructions into corresponding sequences of micro instructions. The micro instructions are placed into a micro instruction queue in order for execution by subsequent stages of the microprocessor. Flow then proceeds to block 704.

At block 704, pairing logic in the translate stage scans the bottom micro instructions in the micro instruction queue, that is, a first micro instruction to be issued during a next clock cycle, and a second micro instruction that immediately follows the first micro instruction in the micro instruction queue. Flow then proceeds to decision block 706.

At decision block 706, the opcodes of the two micro instructions are evaluated to determine if the two micro instructions can be paired. If the two opcodes fall within pairing rules, then flow proceeds to decision block 708. If not, then flow proceeds to block 714.

At decision block 708, operands corresponding to the two micro instructions are evaluated. If operand dependencies are present, then flow proceeds to block 714. If the two micro instructions do not exhibit operand dependencies, then flow proceeds to decision block 710. If. operand dependencies do exist, then flow proceeds to block 714.

At decision block 710, the two micro instructions are evaluated to determine if they would contend for the same logic resources in the microprocessor, were they to be issued in parallel. If they would not contend for the same logic resources, then the micro instructions are pairable and flow proceeds to block 712. If they do conflict in their logic resource utilization, then the two micro instructions are not pairable, and flow proceeds to block 714.

At block 712, the two back-to-back non-conflicting micro instructions are retrieved from the micro instruction queue and are paired together in the microprocessor pipeline for parallel execution. During the next clock cycle, both micro instructions will be issued concurrently for execution. Flow then proceeds to block 716.

At block 714, because the two micro instructions are not pairable, only the first micro instruction is issued during the next clock cycle for execution. The second micro instruction will be issued during the clock cycle following the next clock cycle. Flow then proceeds to block 716.

At block 716, the method completes.

Although the present invention and its objects, features, and advantages have been described in detail, other embodiments are encompassed by the invention. For example, the present invention has been particularly characterized in terms of a microprocessor pipeline that is oriented toward the efficient combination of specific types of micro instructions. FIGS. 3 and 6 allude to six pairings of back-to-back operations. However, pairing rules implemented by pairing logic are provided to exploit pairings that have a high likelihood of occurring in a present day application program, such as SIMD/SIMD pairs. However, the present invention would apply to, say floating point/floating point pairs, if floating point timing became an issue. In such a case, the present invention can be modified to provide another parallel floating point execution unit and pairing rules would be modified to pair two floating point micro instructions, of load-ALU-store instructions.

In addition, the present invention has been characterized in terms of x86-compatible instructions for execution on an x86-compatible microprocessor. It is noted, however, that the present invention comprehends any microprocessor, array processor, micro controller, signal processor, or similar device that processes instructions in a pipeline manner.

Moreover, future application programs may feature even more extensive use of SIMD instructions for processing of digital imagery or speech, to the extent that performance improvement can be cost-effectively obtained by adding a third, or more, parallel SIMD execution units along with commensurate micro instruction registers and ports on upper stage logic. The present invention comprehends the addition of more parallel SIMD execution units and commensurate instruction path logic to accommodate future increased reliance on SIMD instructions.

Those skilled in the art should appreciate that they can readily use the disclosed conception and specific embodiments as a basis for designing or modifying other structures for carrying out the same purposes of the present invention without departing from the spirit and scope of the invention as defined by the appended claims.

What is claimed is:

1. An apparatus for pairing micro instructions for parallel execution by a pipeline microprocessor, the apparatus comprising:

a micro instruction queue, configured to buffer and order micro instructions for sequential execution by the pipeline microprocessor, wherein a second micro instruction in said micro instruction queue is ordered to execute immediately following execution of a first micro instruction; and pairing logic, coupled to said micro instruction queue, configured to combine said first and second micro instructions so that said first and second micro instructions are executed in parallel, within a single pipeline of the pipeline microprocessor.

2. The apparatus as recited in claim 1, wherein said first and second micro instructions are provided by a translator to said micro instruction queue.

3. The apparatus as recited in claim 1, wherein said micro instruction queue buffers and orders more than two micro instructions for sequential execution by the pipeline microprocessor.

4. The apparatus as recited in claim 3, wherein said first micro instruction is positioned in said micro instruction queue such that it will be issued for execution during a following clock cycle.

5. The apparatus as recited in claim 4, wherein second operands corresponding to said second micro instruction are independent of a destination operand corresponding to said first micro instruction.

6. The apparatus as recited in claim 5, wherein said first and second micro instructions each employ non-conflicting logic resources within each stage of the pipeline microprocessor.

7. The apparatus as recited in claim 6, further comprising:

two micro instruction registers, coupled to said pairing logic, configured to receive said first and second micro instructions, and to issue both said first and second micro instructions during said following clock cycle for parallel execution by the pipeline microprocessor.

8. The apparatus as recited in claim 7, further comprising:

register logic, coupled to said two micro instruction registers, configured to receive said first and second micro instructions in parallel, and to provide first operands and said second operands as prescribed by said first and second micro instructions.

9. The apparatus as recited in claim 8, wherein only one of said first and second micro instructions may prescribe a memory access operation.

10. The apparatus as recited in claim 9, wherein only one of said first and second micro instructions may prescribe an integer operation.

11. The apparatus as recited in claim 10, wherein both said first micro instruction and said second micro instruction may prescribe a SIMD operation.

12. An apparatus in a pipeline microprocessor for executing non-conflicting micro instructions in parallel, the apparatus comprising:

pairing logic, for combining a first micro instruction with a following micro instruction so that said first micro instruction and said following micro instruction are queued for parallel execution within a first pipeline of the pipeline microprocessor;

two micro instruction registers, coupled to said pairing logic, for receiving said first and following micro instructions following combination, and for issuing said first and following micro instructions in parallel for execution by said first pipeline during a next clock cycle.

13. The apparatus as recited in claim 12, wherein said first and following micro instructions are generated by an instruction decoder.

14. The apparatus as recited in claim 13, further comprising:

a micro instruction queue, coupled to said pairing logic, for buffering a sequence of micro instructions generated by said instruction decoder, wherein said first and following micro instructions are part of said sequence of micro instructions.

15. The apparatus as recited in claim 14, wherein said first micro instruction is positioned prior to combination in said micro instruction queue such that it will be issued for execution during said next clock cycle.

16. The apparatus as recited in claim 15, wherein following operands corresponding to said following micro instruction are independent of a destination operand corresponding to said first micro instruction.

17. The apparatus as recited in claim 16, wherein said first and following micro instructions direct the use of non-conflicting logic resources within each stage of the pipeline microprocessor.

18. The apparatus as recited in claim 17, further comprising:

register file logic, coupled to said two micro instruction registers, configured to receive said first and following micro instructions in parallel, and to provide first operands and said following operands as prescribed by said first and following micro instructions.

19. The apparatus as recited in claim 18, wherein, if said first and following micro instructions both specify memory access operations, then said pairing logic does not combine said first and following micro instructions for parallel execution, but rather forwards each of said first and following micro instructions in sequence to one of said two micro instruction registers.

20. The apparatus as recited in claim 19, wherein, if said first and following micro instructions both specify integer ALU operations, then said pairing logic does not combine said first and following micro instructions for parallel execution, but rather forwards each of said first and following micro instructions in sequence to one of said two micro instruction registers.

21. The apparatus as recited in claim 18, further comprising:

a first SIMD execution unit, coupled to said register file logic, for receiving operands corresponding to said first micro instruction, and for performing SIMD operations as directed by said first micro instruction.

22. The apparatus as recited in claim 19, further comprising:

a second SIMD execution unit, coupled to said register file logic, for receiving said following operands corresponding to said following micro instruction, and for performing SIMD operations as directed by said following micro instruction.

23. A micro instruction pairing mechanism within a pipeline microprocessor, comprising:

a plurality of micro instruction buffers, configured to queue an ordered sequence of micro instructions for sequential execution by the pipeline microprocessor, said plurality of micro instruction buffers comprising:

a first buffer, configured to store a first micro instruction, wherein said first micro instruction is ordered to be issued for execution by a first pipeline during a next clock cycle; and a second buffer, configured to store a second micro instruction, wherein said second micro instruction is ordered to be issued to said first pipeline immediately after said first micro instruction during a following clock cycle;

pairing logic, coupled to said plurality of micro instruction buffers, configured to pair said first and second micro instructions so that they are both issued to said first pipeline for execution during said next clock cycle; and two micro instruction registers, coupled to said pairing logic, configured to receive said first and second micro instructions following pairing, and to issue said first and second micro instructions in parallel for executionby said first pipeline during said next clock cycle.

24. The micro instruction pairing mechanism as recited in claim 23, wherein said ordered sequence of micro instructions is provided to said plurality of micro instruction buffers by translate stage logic in the pipeline microprocessor.

25. The micro instruction pairing mechanism as recited in claim 24, wherein second operands prescribed by said second micro instruction are not produced as a result of executing said first micro instruction.

26. The micro instruction pairing mechanism as recited in claim 25, wherein said first and second micro instructions do not require use of the same logic resources within a given stage of the pipeline microprocessor.

27. The micro instruction pairing mechanism as recited in claim 26, further comprising:

register logic, coupled to said two micro instruction registers, configured to receive said first and second micro instructions during said next clock cycle, and to provide first operands and said second operands as prescribed by said first and second micro instructions.

28. The micro instruction pairing mechanism as recited in claim 27, wherein said pairing logic does not pair two micro instructions within said ordered sequence of micro instructions if both of said two micro instructions prescribe memory access operations.

29. The micro instruction pairing mechanism as recited in claim 28, wherein said pairing logic does not pair said two micro instructions if both of said two micro instructions prescribe integer ALU operations.

30. The micro instruction pairing mechanism as recited in claim 29, further comprising:

first SIMD execution logic, coupled to said register logic, for receiving operands corresponding to said first micro instruction, and for performing SIMD operations as directed by said first micro instruction.

31. The micro instruction pairing mechanism as recited in claim 30, further comprising:

second SIMD execution logic, coupled to said register logic, for receiving said second operands corresponding to said second micro instruction, and for performing SIMD operations as directed by said second micro instruction.

32. A method for combining micro instructions for parallel execution in a pipeline microprocessor, comprising:

a) detecting, within a micro instruction queue, that a second micro instruction can be executed in parallel with a first micro instruction without causing a resource or operand conflict within the same pipeline, wherein the second micro instruction immediately follows the first micro instruction in the micro instruction queue;

b) providing the first and second micro instructions in parallel to micro instruction registers;

c) reordering micro instructions that remain in the micro instruction queue to eliminate a void created by said providing; and d) routing the first and second micro instructions in parallel to execution logic in the same pipeline of the pipeline microprocessor.

33. The method as recited in claim 32, wherein said detecting comprises:

i) confirming that operands required for the second micro instruction are not based upon execution of the first micro instruction.

34. The method as recited in claim 33, wherein said detecting further comprises:

ii) confirming that the first and second micro instructions do not both specify a memory access operation; and iii) confirming that the first and second micro instructions do not both specify an integer ALU operation.

35. The method as recited in claim 34, wherein said routing comprises:

i) providing the first and second micro instructions to both integer execution logic and SIMD execution logic during the same clock cycle.

36. The method as recited in claim 35, wherein the micro instructions in the micro instruction queue have been generated by an instruction decoder.

* * * * *